US006247468B1

United States Patent
Wood

(10) Patent No.: US 6,247,468 B1
(45) Date of Patent: Jun. 19, 2001

(54) FLUID COLLECTOR FOR BARBECUE GRILL

(76) Inventor: Kenneth L. Wood, 8532 Stratford La. North, Brooklyn Park, MN (US) 55443

( * ) Notice: Subject to any disclaimer, the term of this patent is extended or adjusted under 35 U.S.C. 154(b) by 0 days.

(21) Appl. No.: 09/651,064

(22) Filed: Aug. 30, 2000

Related U.S. Application Data
(60) Provisional application No. 60/151,299, filed on Aug. 30, 1999.

(51) Int. Cl.[7] ............................... F24C 3/00; F24C 15/14
(52) U.S. Cl. ..................... 126/41 R; 126/51; 126/9 B; 126/25 R; 99/446
(58) Field of Search ................... 126/25 R, 41 R, 126/51, 9 R, 9 B, 25 C, 37 B, 41 D; 99/444, 445, 446

(56) References Cited

U.S. PATENT DOCUMENTS

| 842,695 | * | 1/1907 | Peters | 126/9 R |
|---|---|---|---|---|
| 3,186,331 | * | 6/1965 | Dettling | 126/41 R |
| 3,296,957 | | 1/1967 | Gagnon et al. | 126/25 R |
| 3,693,534 | * | 9/1972 | Martin | 126/25 R |
| 3,959,620 | * | 5/1976 | Stephen, Jr. | 126/41 R |
| 4,508,024 | * | 4/1985 | Perkins | 99/445 |
| 4,574,770 | | 3/1986 | Wells | 126/25 R |
| 4,598,634 | * | 7/1986 | Van Horn, II | 99/445 |
| 4,606,261 | * | 8/1986 | Bernardi | 99/445 |
| 4,608,917 | | 9/1986 | Faaborg | 99/446 |
| 4,736,729 | * | 4/1988 | Beach | 126/39 R |
| 4,773,319 | * | 9/1988 | Holland | 126/41 R |
| 4,862,795 | * | 9/1989 | Hawkins | 99/444 |
| 4,867,051 | * | 9/1989 | Schalk | 99/444 |
| 4,872,631 | * | 10/1989 | Rutigliano | 99/446 |
| 4,878,477 | * | 11/1989 | McLane | 126/41 R |
| 4,909,137 | * | 3/1990 | Brugnoli | 99/444 |
| 5,076,154 | | 12/1991 | Bagwell | 99/446 |
| 5,117,747 | * | 6/1992 | Kuchler | 126/41 R |
| 5,325,843 | | 7/1994 | Bravata, Jr. | 126/41 R |
| 5,566,606 | * | 10/1996 | Johnston | 126/25 R |
| 5,582,094 | * | 12/1996 | Peterson et al. | 126/25 R |
| 5,595,108 | | 1/1997 | Sheu | 99/446 |
| 5,865,101 | | 2/1999 | Brown | 99/446 |
| 6,053,160 | * | 4/2000 | Scarborough | 126/41 R |

* cited by examiner

*Primary Examiner*—Ira S. Lazarus
*Assistant Examiner*—Josiah C. Cocks

(57) ABSTRACT

A collector adapted to be mounted on the rear top edge of the base of a conventional barbecue grill to receive and collect condensed moisture running off the lower rear edge of the grill cover has a sloped bottom wall terminating in an opening through which the fluid drains. A receptacle suspended below the opening on a hanger retains the fluid for subsequent disposal. The hanger is secured to the leg of the grill stand to anchor the collector to the grill.

18 Claims, 4 Drawing Sheets

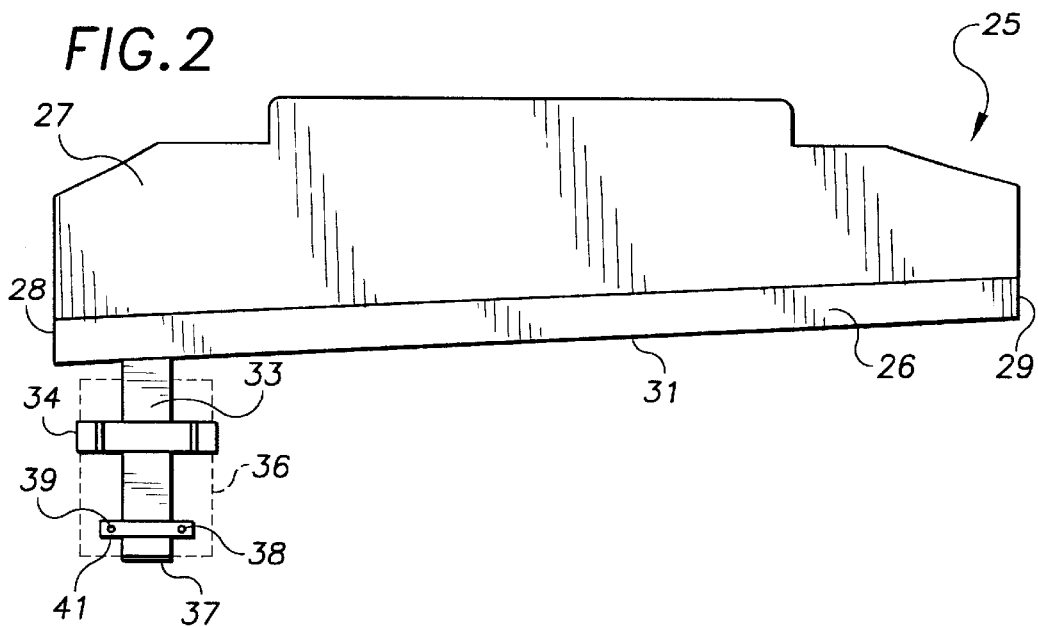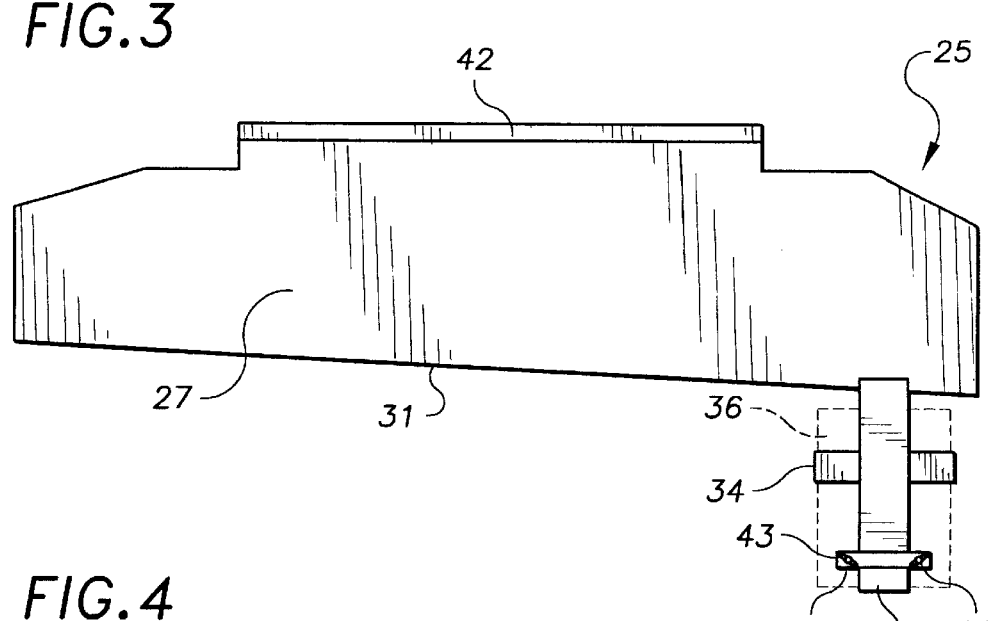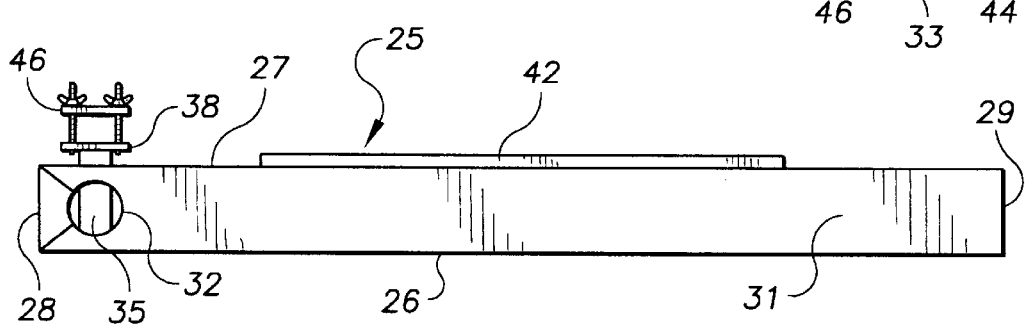

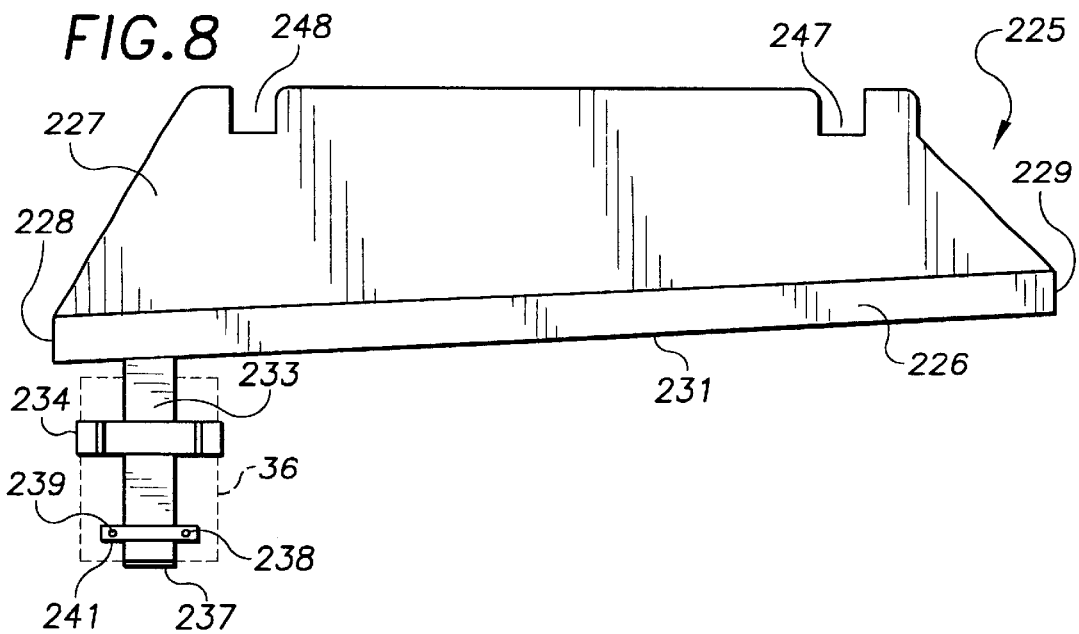
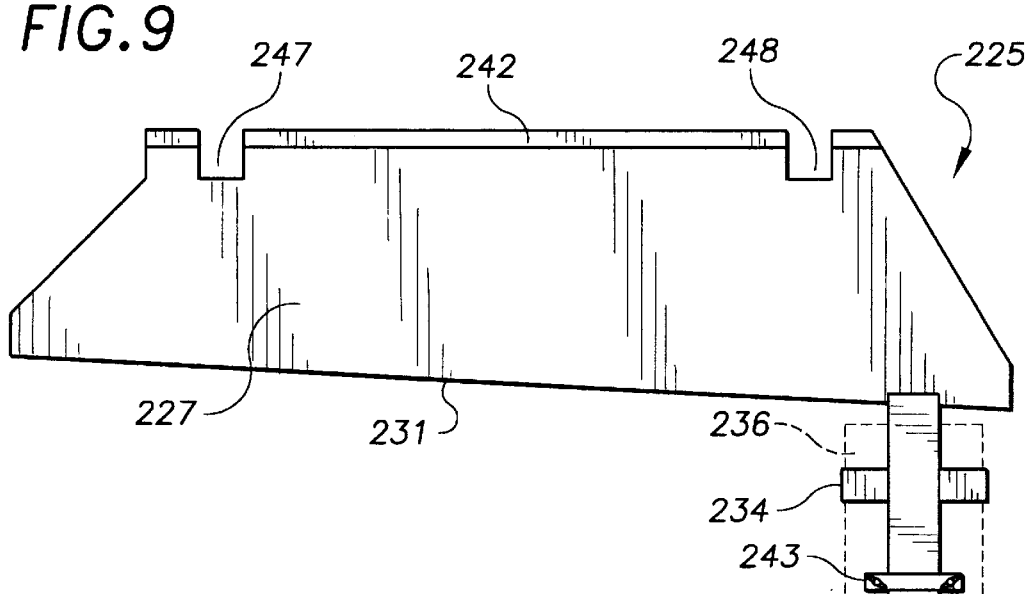
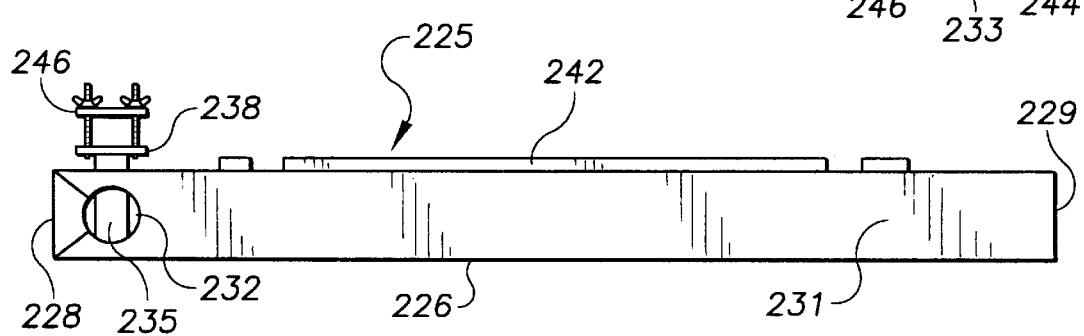

FLUID COLLECTOR FOR BARBECUE GRILL

This appln. claims benefit of Provisional No. 60/151,299 filed Aug. 30, 1999.

FIELD OF THE INVENTION

The present invention is in field of fluid collectors adapted to fit conventional barbecue grills. The device more particularly is a barbecue grill accessory for collecting and receiving moisture running off the back side of the cover of a grill.

BACKGROUND OF THE INVENTION

Barbecuing outside on warm evenings is one of summer's great pleasure. It is common to roast or broil meat and/or fish on a rack over a source of heat, such as over hot coals of a conventional barbecue grill. Typically, the grill is covered with a cover or lid while the food is barbecued. Moisture released from the food during the roasting process condenses into a fluid as it contacts the lid. This fluid drips off the lower edge of the lid and onto the surface adjacent the grill resulting in undesirable stains, property damage and potential hazards.

SUMMARY OF THE INVENTION

The collector of the invention is adapted to be mounted on the base of a conventional electrical or gas-fired barbecue grill adjacent the rear edge of the grill cover. As the condensed moisture runs or drips off the lower edge of the cover, it is collected in the collector. Also, as the cover is pivoted to an open position, condensed moisture runs off the edge of the cover into the collector. The collector has a sloped bottom wall which slopes downwardly toward an opening through which the fluid drains. A receptacle suspended below the opening on a bracket retains the fluid for subsequent disposal. The receptacle suspension bracket attaches to a rear leg of the grill stand to anchor and stabilize the collector relative to the grill.

The collector is a quadrilateral shaped open top member that extends the length of the grill cover. The collector has a front wall, back wall and end walls joined to a bottom wall forming a collection chamber. The depth and width of the collection chamber is such that the lower edge of the cover is located above the bottom wall of the collector between the front wall and back wall of the collector. The top of the back wall of the collector has an outwardly turned lip adapted to extend over the top edge of the base of the grill to hang the collector from the grill. There are no gaps between the back wall of the collector and the grill. The back wall extends between the hinges pivotally connecting the cover to the base of the grill to limit any transverse movement of the collector relative to the base. The bracket has a brace which attaches to a leg of the grill stand to anchor and stabilize the collector.

DESCRIPTION OF THE DRAWING

FIG. 2 is a front elevational view of the fluid collector of FIG. 1;

FIG. 3 is a rear elevational view of the fluid collector of FIG. 1;

FIG. 4 is a top plan view of FIG. 2;

FIG. 8 is a front elevational view of a second modification of the fluid collector of FIG. 1;

FIG. 9 is a rear elevational view of FIG. 8; and

FIG. 10 is is a top plan view of FIG. 8;

DESCRIPTION OF PREFERRED EMBODIMENTS

Figure 1:
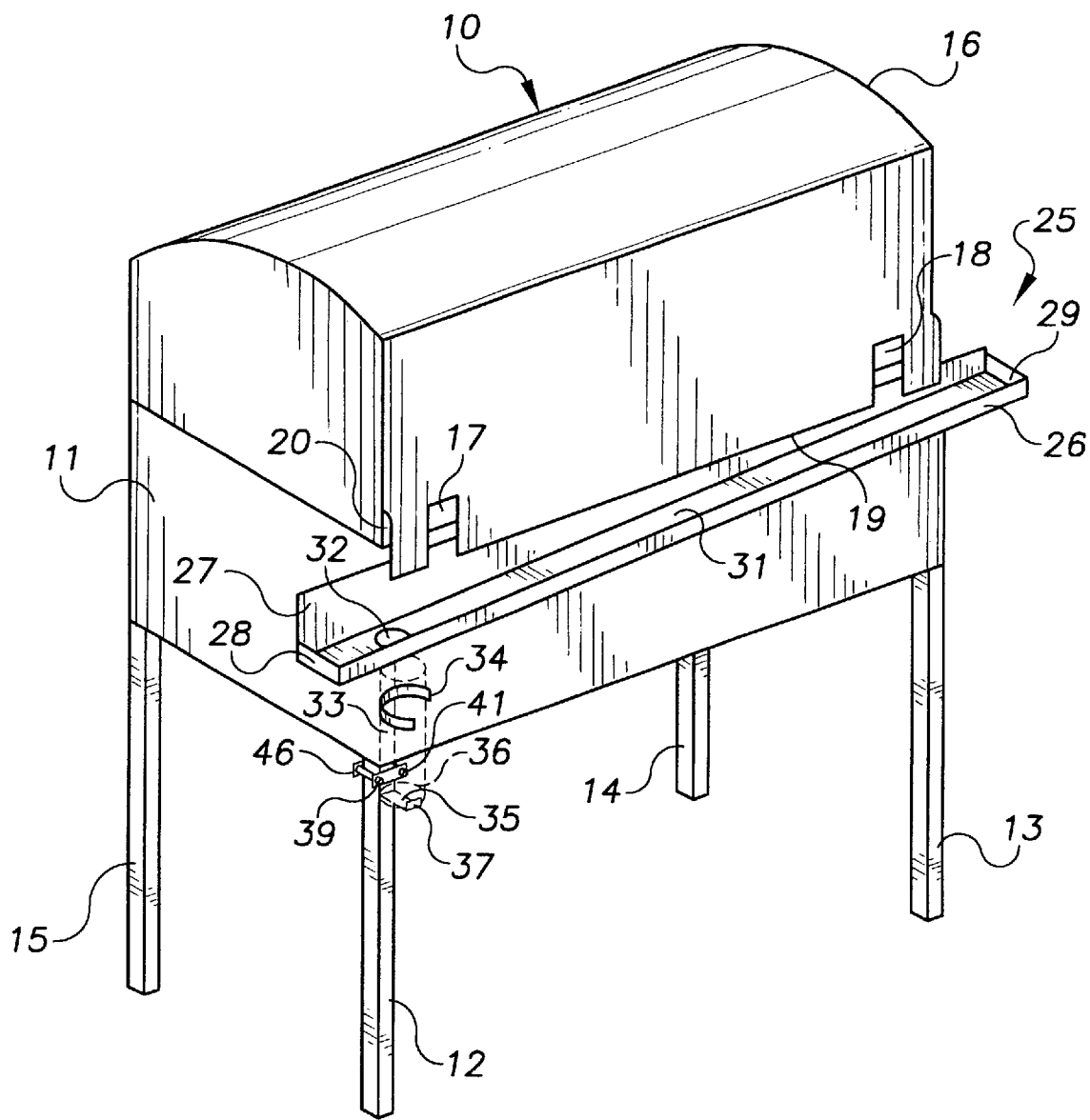
FIG. 1 is a perspective view of a barbecue grill equipped with the fluid collector of the invention.

Referring to FIG. 1, the fluid collector 25 of the invention is used to catch, collect and retain moisture condensing on the inner surface of a cover 16 for a grill 10 during the roasting of food. Grill 10 has a base 11 which is supported by a plurality of legs 12, 13, 14 and 15. A lid or cover 16 pivotally mounted on the base 11 encloses the cooking chamber. Hinges 17 and 18 pivotally connect cover 16 to the rear wall of base 11. Cover 16 has a rear edge 19 which is spaced rearwardly from the rear wall of base 11 creating a gap or space 20 between edge 19 and the base to allow steam and vapor released from food being cooked to vent from the cooking chamber. Collector 25 is adapted to be mounted on the rear wall of base 11 for collecting fluid condensing on cover 16 which drips off the rear edge 19 of the cover.

Referring to FIGS. 1 to 4, collector indicated generally at 25 has an upright front wall 26, back wall 27 and end walls 28 and 29 joined to a bottom wall 31 to form an open top quadrilateral shaped collection member. Bottom wall 31 slopes downwardly towards a fluid outlet 32. A bracket member 33 attached to back wall 27 extends below outlet 32. Bracket member 33 has an annular clip 34 having resilient free outer ends to grip a receptacle 36, such as a cylindrical shaped container shown in dotted lines in FIGS. 2 and 3, for retaining fluid draining through outlet 32. Receptacle 36 can be easily removed from bracket 33 when full and discarded or emptied. Collector 25 does not have to be removed from grill 10 to discard drained fluid. A bottom member 35 of bracket 33 extends laterally to support the bottom of receptacle 36. As shown in FIG. 4, bottom member 35 is in vertical alignment with fluid outlet opening 32. The outer end of bottom member 35 has an upwardly turned lip 37 to hold the bottom of receptacle 36 on the bracket 33. A brace 38 located below base 11 of grill 10 is attached to bracket 33. Brace 38 has a pair of lateral arms 39 and 41 that extend rearwardly and straddle leg 12 of grill 10 to prevent movement of collector 25 relative to grill 10 thereby stabilizing and anchoring collector 25 to grill 10. The ends of arms 39 and 41 extend through holes in a second bracket member 46. Fasteners, such as nuts 43 and 44, threaded onto the ends of arms 39 and 41 hold brace members 38 and 46 in a tight fit relation with leg 12.

Referring to FIGS. 3 and 4, the middle portion of back wall 27 of collector 25 has an outwardly curved top edge or lip 42 that extends over the top of the rear wall of base 11 to hold collector 25 on grill 10. The outer ends of back wall 27 adjacent the opposite ends of lip 42 incline downwardly and outwardly from lip 42 toward base 11 to collect fluid dripping off the outer ends of cover 16 and hinges 17 and 18. Lip 42 extends over base 11 between hinges 17 and 18 and has a length substantially the same as the distance between the hinges to prevent collector 25 from sliding laterally along the top of base 11. Fastener 46 cooperates with lip 42 to securely anchor collector 25 to grill 10. The length of lip 42 can be modified to fit various grill sizes and shapes, such as grills having longer or shorter bases or bases having curved walls, or grills without hinges pivotally connecting the grill cover to the rear wall of the grill base.

In use, collector 25 is mounted on base 11 of grill 10 by placing lip 42 over the top of the rear wall of the base. The outer ends of lip 42 are located immediately adjacent hinges 17 and 18 to prevent lateral movement of collector 25 relative to grill 10. Arms 39 and 41 of brace 38 straddle leg 12. Fastener 46 secures bracket 33 to grill leg 12 to stabilize and anchor collector 25 to grill 10. Downwardly sloping bottom wall 31 of collector 25 extends outwardly from base 11 and is located outside the interior of the cooking chamber of grill 10. The length and width of collector 25 is sufficient to collect any condensed moisture or liquids running and dripping off edge 19 of grill cover 16 during food roasting procedures. The collected fluid is then directed to fluid outlet 32 in bottom wall 31 due to the downward sloping surface of wall 31. The fluid drains into a receptacle 36 suspended directly below outlet 32 on bracket 33 and is retained in receptacle 36 until subsequent disposal. Collector 25 protects surfaces supporting grill 10, such as patios, deck surfaces and driveways, from stains and damage due to moisture and fluid drippings from the rear edge 19 of cover 16 during the roasting and barbecuing of food. Collector 25 does not have to be removed from the grill to dispose of the collected fluid.

Figure 5:
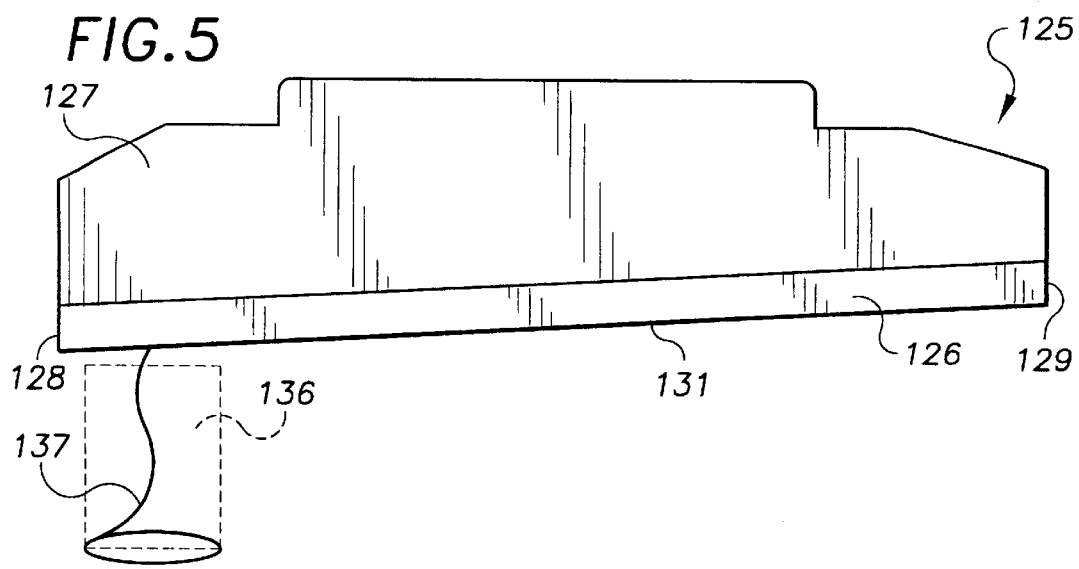
FIG. 5 is a front elevational view of a modification of the fluid collector of FIG. 1.
Figure 6:
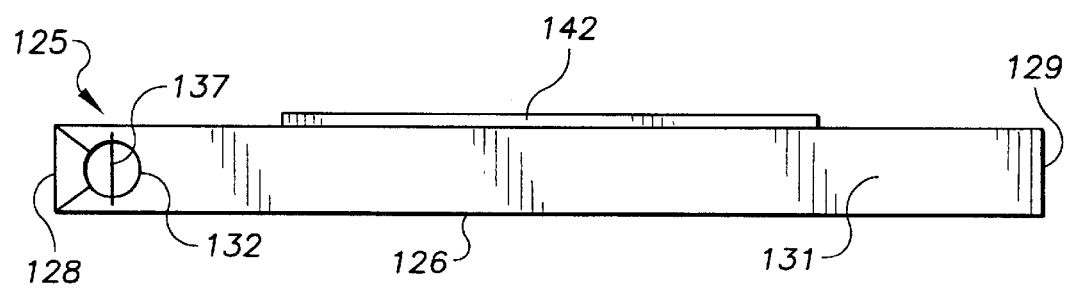
FIG. 6 is a top plan view of FIG. 5.
Figure 7:
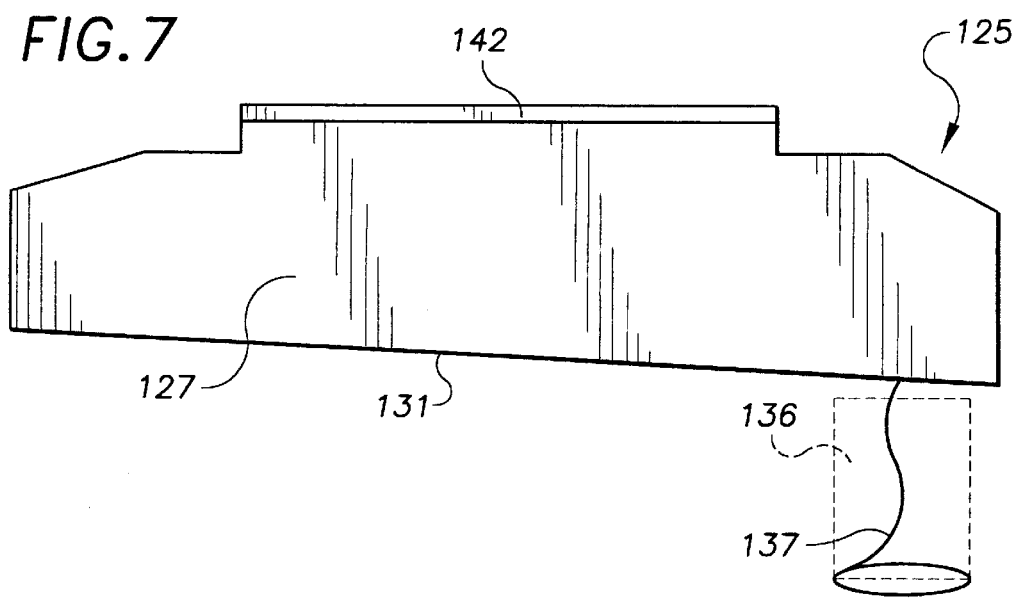
FIG. 7 is a rear elevational view of FIG. 5.

The parts of fluid collector 125 shown in FIGS. 5 to 7 that correspond to fluid collector 25 have the same reference number with a prefix 1.

Referring to FIGS. 5 to 7, fluid collector 125 has upright front, back and end walls 126, 127, 128 and 129 and a sloped bottom wall 131. Collector 125 is an open top quadrilateral-shaped member extending the length of the back side of a barbecue grill 10 and has sufficient width to catch and collect condensed moisture running off or dripping from the lower back edge 19 of the grill cover 16 during the roasting process or when cover 16 is pivoted to an open position. Back wall 127 has an outwardly curved top edge or lip 142 which is adapted to extend over the top of the rear wall of base 11 to hang collector 125 on grill 10. The outer ends of lip 142 are located adjacent the hinges 17 and 18 pivotally mounting cover 16 to base 11 thereby limiting lateral movement of collector 125. The outer ends of wall 127 adjacent opposite ends of lip 142 incline rearwardly and outwardly toward the back of grill 10 to collect drippings off the outer ends of cover 16. Bottom wall 131 slopes downwardly to an opening or fluid outlet 132 through which fluid drains. A receptacle 136, shown in broken lines in FIGS. 5 and 7, suspended below opening 132 on a hanger 137 retains the fluid for subsequent disposal.

Collector 225 is adapted to be mounted on the rear wall of a barbecue grill during roasting of food such as meat, fish and vegetables, for collecting condensed fluid dripping from the lower edge of the grill cover.

The parts of fluid collector 225 shown in FIGS. 8 and 9 that correspond to fluid collector 225 have the same reference numbers with a prefix 2.

Referring to FIGS. 8 to 10, collector 225 has a front wall 226, back wall 227, and end walls 228 and 229 joined to an inclined downwardly sloped bottom wall 231. Bottom wall 231 has a fluid outlet or opening 232 located at its lowest most point adjacent end wall 228 which allows fluid drippings to drain into a receptacle 236 located below outlet opening 232. Fluid outlet 232 is aligned with the leg of the grill stand. A bracket member 233 attached to back wall 227 releasably holds receptacle 236 directly below opening 232. A resilient clip 234 secured to bracket member 233 grips receptacle 236 and allows receptacle 236 to be emptied or replaced as necessary. Collector 225 does not have to be removed from the grill to discard collected fluid. The bottom of receptacle 236 is supported on a laterally extended bottom support 235 of bracket 233. Bottom support 235 is a linear generally flat member vertically aligned with opening 232. A brace member 238 extending rearwardly from bracket 233 secures collector 225 to a rear leg of the grill stand. This limits swinging and movement of collector 225 preventing inadvertent spilling of fluid in stormy or windy conditions. Brace member 238 has a pair of rearwardly extending threaded arms 239 and 241 that are adapted to straddle one of the rear legs of a barbecue grill stand. The ends of arms 239 and 241 extend through holes in a rear brace member 246. Fasteners, such as nuts 243 and 244, threaded onto the ends of arms 239 and 241 hold brace members 238 and 246 in a tight fit relationship with the leg of the grill stand to anchor collector 225 to the grill thereby preventing swinging and movement of the collector.

Referring to FIG. 9, back wall 227 has an outwardly curved top lip 242 which hooks over the rear top edge of a grill whereby there is no gapping between the rear top edge of the grill and the top of back wall 227. Fluid dripping from the grill cover cannot drip between the grill and collector 225. A pair of laterally spaced grooves 247 and 248 accommodate the hinges connecting the cover of the grill to the grill base. Back wall 242 of collector 225 has a length and width sufficient to extend the length of and cover the rear wall of the grill so as to collect any condensed moisture flowing from the lower back edge of the grill cover. The outer ends of wall 227 flare laterally from grooves 247 and 248 to prevent moisture from dripping off the outer ends of the grill cover and hinges and staining the surface adjacent the grill.

There has been shown and described embodiments of the fluid collector of the invention. Changes in the structures and arrangements of structure can be made by persons skilled in the art without departing from the novel and advantageous features of the invention. The invention is defined in the following claims.

What is claimed is:

1. A fluid collector for collecting condensed moisture from a barbecue grill comprising: an open top collection member having a front wall, back wall, and end walls joined to a bottom wall, the back wall having a top portion with an outwardly curved lip adapted for hooking over a rear top edge of a base of a barbecue grill to hook the member to the rear top edge of the base whereby the bottom wall extends outwardly from the base and is located outside the interior of a cooking chamber of the grill in alignment with a rear lower edge of a cover of the grill, the bottom wall of the member having a bottom surface and a fluid outlet opening, the bottom surface inclining downwardly to the fluid outlet opening to allow fluid flowing from the rear lower edge of the cover and collected in the member to flow from the member, receptacle means located below the opening to retain fluid flowing through the fluid outlet opening from the member, and bracket means connected to the member for releasably suspending the receptacle means below the fluid outlet opening, the bracket means including fastening means adapted for securing to a rear leg of a barbecue grill to anchor the member to the grill.

2. The fluid collector of claim 1 wherein: the fastening means includes a first brace member and a second brace member, the first brace member having a pair of rearwardly extending threaded arms adapted for straddling a rear leg of the grill, the arms extending through holes in the second brace member, and fastener means threaded onto the arms to hold the first and second brace members in a tight fit relationship with the rear leg of the grill.

3. The fluid collector of claim 2 wherein: the bracket means has clip means for releasably holding the receptacle means below the fluid outlet opening.

4. The fluid collector of claim 2 wherein: the bracket means has a bottom member in vertical alignment with the fluid outlet opening for supporting the receptacle means below the fluid outlet opening.

5. A fluid collector for collecting condensed moisture from a barbecue grill comprising: an open top collection member having a front wall, back wall, and end walls joined to a bottom wall. the back wall having a top portion with an outwardly curved lip adapted for hooking over a rear top edge of a base of a barbecue grill to hook the member to the rear top edge of the base whereby the bottom wall extends outwardly from the base and is located outside the interior of a cooking chamber of the grill in alignment with a rear lower edge of a cover of the grill, the bottom wall of the member having a bottom surface and a fluid outlet opening, the bottom surface inclining downwardly to the fluid outlet opening to allow fluid flowing from the rear lower edge of the cover and collected in the member to flow from the member, receptacle means located below the opening to retain fluid flowing through the fluid outlet opening from the member, and bracket means connected to the member for releasably suspending the receptacle means below the fluid outlet opening, the bracket means being attached to the back wall and extending downwardly below the bottom wall adjacent the fluid outlet opening.

6. The fluid collector of claim 2 wherein: the back wall has a pair of laterally spaced grooves adapted for accommodating hinges connecting a cover of the grill to a base of the grill.

7. The fluid collector of claim 6 wherein: the back wall has outer ends extending downwardly and outwardly from the lip.

8. The fluid collector of claim 5 wherein: the lip is adapted for extending over the top edge of the base between hinges connecting the cover to the base of the grill.

9. A combined barbecue grill for roasting food and a fluid collector for collecting condensed moisture from the grill: a base having a front wall, rear wall, side walls, and a bottom wall defining a cooking chamber, the rear wall having a top edge, a plurality of legs connected to the base for supporting the base on a surface, a cover pivotally connected to the base covering the cooking chamber, a pair of laterally spaced hinges pivotally connecting the cover to the base, the cover having a rear lower edge spaced outwardly from the top edge of the rear wall, an open top fluid collection member secured to the base and one of the legs, the collection member having a front wall, back wall, and end walls joined to a bottom wall, the back wall having a top portion with an outwardly curved lip hooked over the top edge of the rear wall whereby the bottom wall extends outwardly from the base and is located outside the interior of a cooking chamber of the grill in alignment with a rear lower edge of the cover, the collection member having a first end and a second end, the bottom wall of the collection member having a bottom surface sloped from the first end toward the second end, the bottom wall having a fluid outlet opening adjacent the second end to allow fluid flowing from the rear lower edge of the cover into the collection member to flow from the collection member, receptacle means located in alignment with the fluid outlet opening to receive and retain fluid flowing through the fluid outlet opening from the member, and bracket means connected to the collection member for holding the receptacle means below the fluid outlet opening, the bracket means including fastening means secured to the one of the legs to anchor the member to the leg.

10. The grill and fluid collector of claim 9 wherein: the fluid outlet opening is in alignment with the one of the legs.

11. The grill and fluid collector of claim 9 wherein: the bracket means extends downwardly below the bottom wall of the base, the fastening means located below the base and extending rearwardly to the one of the legs.

12. The grill and fluid collector of claim 11 wherein: the bracket means extends downwardly in alignment with the one of the legs.

13. The grill and fluid collector of claim 9 wherein: the bracket means has clip means for releasably holding the receptacle means below the fluid outlet opening.

14. The grill and fluid collector of claim 9 wherein: the fastening means includes a first brace member and a second brace member, the first brace member having a pair of rearwardly extending threaded arms straddling the one of the legs, the arms extending through holes in the second brace member, and a fastener threaded onto each of the ends of the arms to hold the first and second brace members in a tight fit relationship with the one of the legs.

15. The grill and fluid collector of claim 9 wherein: the lip extends over the top edge of the base between the hinges, the lip having a length substantially the same as the distance between the hinges.

16. The grill and fluid collector of claim 9 wherein: the back wall of the collection member has a pair of laterally spaced grooves accommodating the hinges.

17. The grill and fluid collector of claim 9 wherein: the first and second ends of the collection member extend outwardly from the rear lower edge of the cover and hinges.

18. The grill and fluid collector of claim 9 wherein: the bracket means is attached to the back wall of the collection member and extends downwardly below the bottom wall adjacent the fluid outlet opening.

* * * * *